Sept. 27, 1938. M. W. GATCH 2,131,534
FLY SWATTER BLADE
Filed April 24, 1937
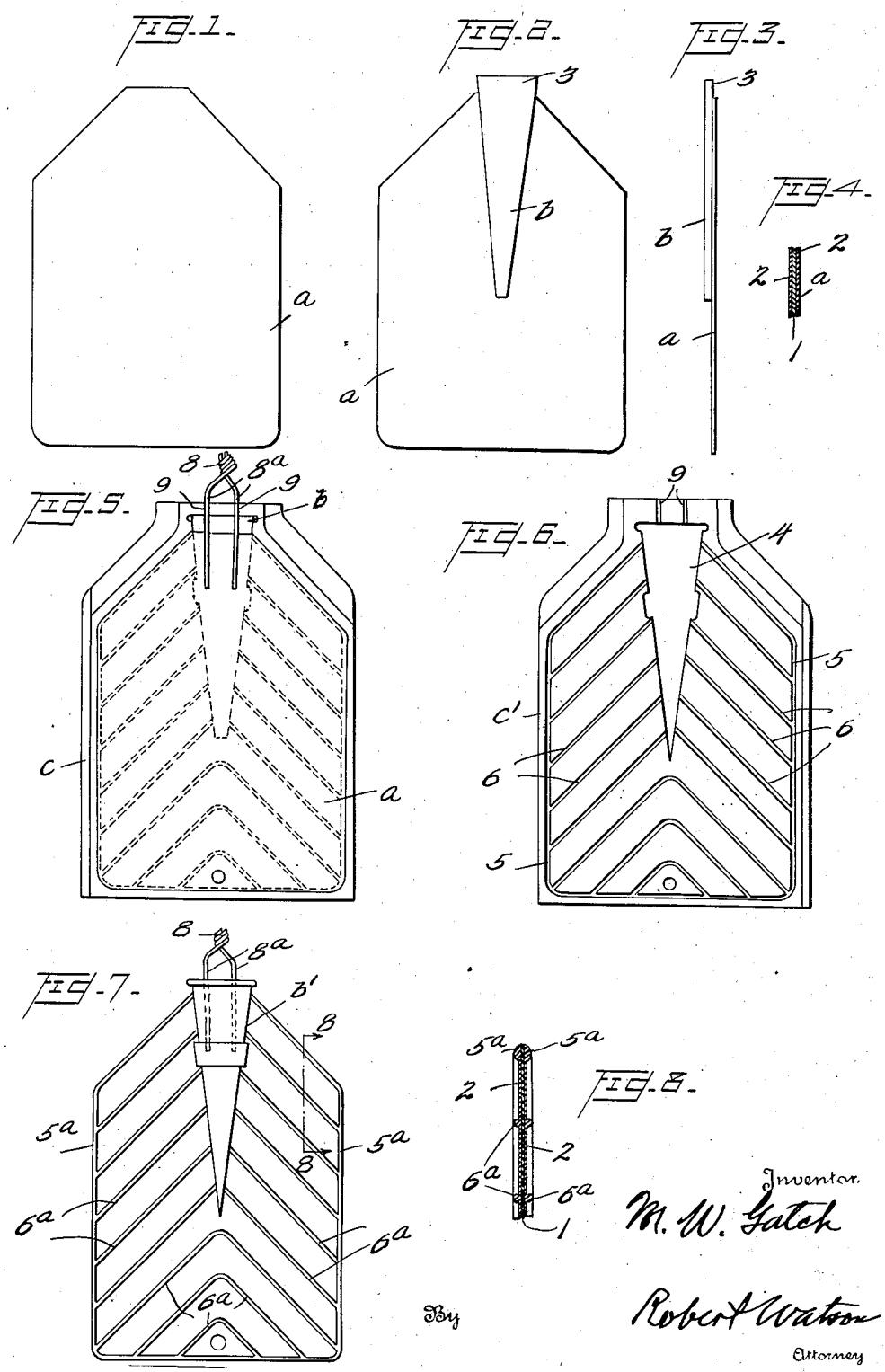

Patented Sept. 27, 1938

2,131,534

UNITED STATES PATENT OFFICE 2,131,534

FLY SWATTER BLADE

Milton W. Gatch, Baltimore, Md., assignor to The Gatch Wire Goods Company, Baltimore, Md., a corporation of Maryland Application April 24, 1937, Serial No. 138,827

10 Claims. (Cl. 43—137)

This invention relates to a fly swatter blade consisting of a sheet of textile fabric thinly rubberized on both sides and having upstanding ribs of solid rubber which give resilience to the blade. In carrying out the invention, a sheet of textile fabric having a thin coating of unvulcanized rubber on each side is cut to the size and shape of swatter blade to be produced. To this sheet is applied a strip of unvulcanized rubber of sufficient thickness to form the handle portion of the blade. The rubberized sheet of fabric, with the rubber strip attached, is then placed in a two-part mold having cavities to mold the handle portion and having a plurality of narrow grooves in those parts of the mold which bear upon the fabric. During the vulcanizing process, the rubber is melted and the pressure applied to the sheet causes some of the rubber to enter the grooves and form rubber ribs on the sheet. The blade may be of any desired form and the rubber ribs may be produced on any desired part of the blade by suitably forming the grooves in the mold. For the purpose of illustration, I have shown a blade with diagonally disposed rubber ribs and a rib extending around the border of the blade. The blade thus produced is more resilient than a blade made of fabric alone or fabric with a plain rubberized surface.

In the accompanying drawing,

Fig. 1 is a plan view of a sheet of rubberized fabric of suitable shape for forming a swatter blade like that illustrated in Figs. 7 and 8;

Fig. 2 is a similar view of the sheet with a strip of rubber applied to it;

Fig. 3 is an edge view of the sheet, looking from right to left in Fig. 2;

Fig. 4 is a section through a portion of the sheet, showing the fabric and its rubber coatings on an enlarged scale;

Fig. 5 shows the sheet of Figs. 2 and 3 laid in a part of a two-part mold;

Fig. 6 is an inner side view of the complementary part of the mold;

Fig. 7 is a plan view of the finished swatter blade, and,

Fig. 8 is a section through the blade on the line 8—8 of Fig. 7.

Referring to the drawing, $a$, Figs. 1 to 3, inclusive, indicates a sheet of textile fabric having a coating of unvulcanized rubber on each side, the fabric 1 and coatings 2 being illustrated in Fig. 4 on an exaggerated scale. The sheet shown is cut to a suitable size and shape for making a blade like that illustrated in Figs. 7 and 8. A tapering strip of unvulcanized rubber $b$, of substantial thickness, is laid upon the sheet along the central longitudinal line of the latter, and the wider end portion 3 of this strip projects beyond the end of the sheet. The strip adheres to the sheet and hence the two parts can be handled as a single piece, and these are placed in a mold part $c$ with the strip lying in a longitudinal channel in the mold. The complementary mold part $c'$ is shown in Fig. 6. The inner faces of these mold parts are alike. Each has a channel 4 which is relatively wide and deep at the narrow end of the mold and projects beyond the end of the rubber sheet when the latter is in the mold, and the channel tapers gradually in width and depth toward the opposite end of the mold part. Each mold part has a narrow marginal channel 5 and a plurality of narrow diagonal channels 6, as shown in Fig. 6.

Before the mold part $c'$ is applied to the part $c$, the end portions $8^a$ of a wire handle 8 are laid in semicircular grooves 9 in the end of the mold and rest on the fabric. Corresponding semi-circular grooves 9 are provided in the end of the mold part $c'$ and when the part $c'$ is laid over the part $c$, the wire ends $8^a$ fit closely within the holes formed by these grooves. The mold parts are then clamped firmly together and the rubberized sheet is gripped firmly between them. The mold is then placed in a vulcanizing oven and, under the influence of heat and pressure, the rubber strip $b$ melts and fills the cavities 4 in both mold parts, enclosing the ends of the handle, and any excess rubber may run into the grooves which connect with these cavities. The rubber on the fabric also flows under the influence of heat and pressure, some of this being absorbed by the fabric, but mainly the rubber is squeezed into the narrow grooves, forming ribs of rubber on the fabric, as shown in Figs. 7 and 8. In these figures, marginal ribs of rubber $5^a$ and diagonal ribs $6^a$ are shown on opposite sides of the blade, these ribs having been formed in the grooves 5 and 6, respectively, in the mold.

The blade may be perforated between the ribs after it has been formed, to permit the air to pass through when the swatter is being used.

Instead of applying a single strip $b$ of rubber to the unvulcanized sheet before placing it in the mold and allowing this strip to fill both longitudinal cavities in the mold, a thinner strip of rubber may be applied to one side of the fabric, and a similar thin strip may be applied to the opposite side of the sheet after the sheet is in the mold, and these strips will run together and form the handle portion $b'$ of the blade.

What I claim is:

1. In a fly swatter, a blade comprising a sheet of textile fabric having a thin coating of vulcanized rubber on each side and ribs of solid rubber projecting from one side of the sheet.

2. In a fly swatter, a blade comprising a sheet of textile fabric having a thin coating of vulcanized rubber on each side and ribs of solid rubber projecting from both sides of the sheet.

3. In a fly swatter, a blade comprising a sheet of textile fabric having a thin coating of vulcanized rubber on each side and a marginal rib of solid rubber projecting from one side of the sheet at its side edges and one of its ends.

4. In a fly swatter, a blade comprising a sheet of textile fabric having a thin coating of vulcanized rubber on each side and a marginal rib of solid rubber projecting from each side of the sheet at its side edges and one of its ends.

5. In a fly swatter, a blade comprising a sheet of textile fabric having a thin coating of vulcanized rubber on each side and ribs of solid rubber projecting from one side of the sheet and extending transversely thereof.

6. In a fly swatter, a blade comprising a sheet of textile fabric having a thin coating of vulcanized rubber on each side and ribs of solid rubber projecting from each side of the sheet and extending transversely thereof.

7. In a fly swatter, a blade comprising a sheet of textile fabric having a thin coating of vulcanized rubber on each side and ribs of solid rubber projecting from one side of the sheet and extending diagonally from its central portion to its edges.

8. In a fly swatter, a blade comprising a sheet of textile fabric having a thin coating of vulcanized rubber on each side and ribs of solid rubber projecting from each side of the sheet and extending diagonally from its central portion to its edges.

9. In a fly swatter, a blade comprising a sheet of textile fabric having a thin coating of vulcanized rubber on each side, a marginal rib of solid rubber projecting from each side of the sheet at its side edges and one of its ends, and ribs of solid rubber projecting from each side of the sheet and extending transversely thereof, the latter ribs terminating at the marginal ribs.

10. In a fly swatter, a blade comprising a sheet of textile fabric having a thin coating of vulcanized rubber on each side, a thickened rubber handle portion at one end of the sheet and extending partly, in tapering form, along its longitudinal center, on both sides of the sheet, and ribs of solid rubber projecting from each side of the sheet.

MILTON W. GATCH.